(12) United States Patent
Bai et al.

(10) Patent No.: US 12,742,975 B2
(45) Date of Patent: Sep. 22, 2026

(54) OPTICAL SYSTEM AND VIRTUAL REALITY DEVICE

(71) Applicant: BOE TECHNOLOGY GROUP CO., LTD., Beijing (CN)

(72) Inventors: Jiarong Bai, Beijing (CN); Ruijun Dong, Beijing (CN); Yulong Wu, Beijing (CN); Chenru Wang, Beijing (CN); Ke Li, Beijing (CN); Na Han, Beijing (CN); Haitao Huang, Beijing (CN); Zhanshan Ma, Beijing (CN); Lili Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 855 days.

(21) Appl. No.: 17/921,825

(22) PCT Filed: Nov. 25, 2021

(86) PCT No.: PCT/CN2021/133277

§ 371 (c)(1),
(2) Date: Oct. 27, 2022

(87) PCT Pub. No.: WO2023/092419

PCT Pub. Date: Jun. 1, 2023

(65) Prior Publication Data

US 2024/0231116 A1 Jul. 11, 2024

(51) Int. Cl.

| | |
|---|---|
| ***G02B 27/09*** | (2006.01) |
| ***G02B 13/00*** | (2006.01) |
| ***G02B 27/01*** | (2006.01) |

(52) U.S. Cl.
CPC ..... *G02B 27/0955* (2013.01); *G02B 13/0035* (2013.01); *G02B 27/0172* (2013.01); *G02B 27/0176* (2013.01); *G02B 2027/0116* (2013.01)

(58) Field of Classification Search
CPC .................................................. G02B 27/0955
See application file for complete search history.

(56) References Cited

U.S. PATENT DOCUMENTS

| | | | | |
|---|---|---|---|---|
| 5,835,279 | A | 11/1998 | Marshall et al. | |
| 2017/0248769 | A1 | 8/2017 | Stamenov | |
| 2019/0331879 | A1* | 10/2019 | Stamenov | G02B 27/0172 |
| 2023/0367122 | A1* | 11/2023 | Lo | G02B 27/0955 |

FOREIGN PATENT DOCUMENTS

| | | | |
|---|---|---|---|
| CN | 201740920 | U | 2/2011 |
| CN | 105589208 | A | 5/2016 |
| CN | 108051920 | A | 5/2018 |

(Continued)

OTHER PUBLICATIONS

Wide Field-of-View, High-Resolution Plastic Lens Design with Low F-Number for Disposable Endoscopy (Year: 2021).*

(Continued)

*Primary Examiner* — Edmond C Lau
(74) *Attorney, Agent, or Firm* — XSENSUS LLP

(57) ABSTRACT

An optical system, includes a first lens, a second lens and a third lens that are sequentially arranged from an image side to an object side, and principal optical axes of the first lens, the second lens and the third lens being collinear. The first lens is a convex lens, and at least one of the second lens and the third lens is a meniscus lens.

20 Claims, 4 Drawing Sheets

(56) References Cited

FOREIGN PATENT DOCUMENTS

| | | |
|---|---|---|
| CN | 110727101 A | 1/2020 |
| CN | 210038290 U | 2/2020 |
| CN | 211426927 U | 9/2020 |

OTHER PUBLICATIONS

The First Office Action mailed Jun. 11, 2025, in Chinese Application No. 202180003580.8, 32 pages including English translation.

* cited by examiner

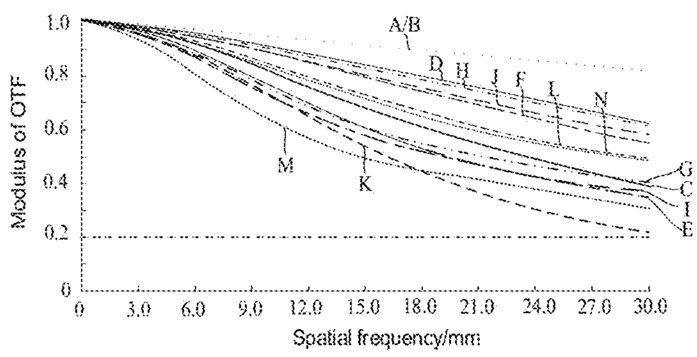

A-FOV 0°, meridian direction B-FOV 0°, sagittal direction C-FOV 5.83°, meridian direction D-FOV 5.83°, sagittal direction
E-FOV 11.67°, meridian direction F-FOV 11.67°, sagittal direction G-FOV 17.5°, meridian direction H-FOV 17.5°, sagittal direction
I-FOV 23.33°, meridian direction J-FOV 23.33°, sagittal direction K-FOV 29.17°, meridian direction L-FOV 29.17°, sagittal direction
M-FOV 35°, meridian direction N-FOV 35°, sagittal direction

FIG. 5

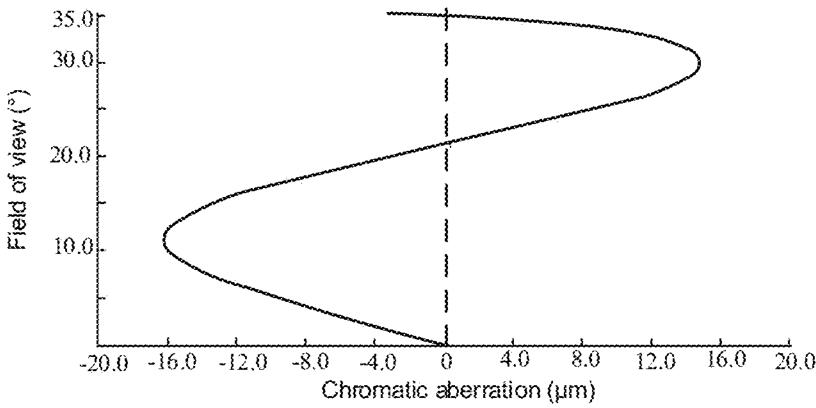

FIG. 6

OPTICAL SYSTEM AND VIRTUAL REALITY DEVICE

CROSS-REFERENCE TO RELATED APPLICATION

This application is a national phase entry under 35 USC 371 of International Patent Application No. PCT/CN2021/133277, filed on Nov. 25, 2021, which is incorporated herein by reference in its entirety.

TECHNICAL FIELD

The present disclosure relates to the field of display technologies, and in particular, to an optical system, and virtual reality devices.

BACKGROUND

In recent years, virtual reality (VR) has become one of the most popular scientific research topics in the field of computer technology, and the corresponding technology has developed rapidly. Virtual reality is a human-machine interface that may realize a natural interaction between human and a virtual environment provided by the computer, and its application and development prospects are very broad, and the market potential is immeasurable. At present, virtual reality has been preliminarily applied in many fields such as mechanical design, scientific computing, film and television entertainment, chemical medicine and military training, and many applications cannot be replaced by other technologies.

SUMMARY

In an aspect, an optical system is provided. The optical system including a first lens, a second lens and a third lens that are sequentially arranged from an image side to an object side, and principal optical axes of the first lens, the second lens and the third lens are collinear. The first lens is a convex lens, and at least one of the second lens and the third lens is a meniscus lens.

In some embodiments, a refractive index of the second lens is not equal to a refractive index of the third lens.

In some embodiments, a ratio of the refractive index of the second lens to the refractive index of the third lens is in a range from 0.85 to 1.15, inclusive; and/or an absolute value of a difference between the refractive index of the second lens and the refractive index of the third lens is greater than or equal to 0.1.

In some embodiments, a ratio of an Abbe number of the second lens to an Abbe number of the third lens is in a range from 0.3 to 3 inclusive, and is not equal to 1; and/or an absolute value of a difference between the Abbe number of the second lens and the Abbe number of the third lens is in a range from 30 to 40, inclusive.

In some embodiments, a ratio of a refractive index of the first lens to a refractive index of the second lens is in a range from 0.85 to 1.15, inclusive.

In some embodiments, a ratio of an Abbe number of the first lens to an Abbe number of the second lens is in a range from 0.3 to 3, inclusive.

In some embodiments, at least one surface of all surfaces of the first lens, the second lens and the third lens is an aspherical surface.

In some embodiments, the aspherical surface is an even-order aspheric surface.

In some embodiments, the first lens and the second lens are not in contact with each other. In an extending direction of the principal optical axes, a distance between surfaces of the first lens and the second lens that are close to each other is in a range from 0.5 mm to 3 mm, inclusive.

In some embodiments, the second lens and the third lens are not in contact with each other, and in an extending direction of the principal optical axes, a distance between surfaces of the second lens and the third lens that are close to each other is in a range from 0.5 mm to 3 mm, inclusive; or the surfaces of the second lens and the third lens that are close to each other are bonded to each other.

In some embodiments, the surfaces of the second lens and the third lens that are close to each other are bonded to each other, and the surfaces that are bonded to each other are each a spherical surface.

In some embodiments, focal lengths of the first lens, the second lens and the third lens are all less than or equal to 50 mm.

In some embodiments, a focal length of the optical system is in a range from 25 mm to 32 mm, inclusive.

In some embodiments, a field of view of the optical system is in a range from 60° to 70°, inclusive.

In some embodiments, the first lens is a biconvex lens, or a meniscus lens with a positive focal power.

In some embodiments, a focal power of the second lens is positive, a focal power of the third lens is negative, and a sum of the focal power of the second lens and the focal power of the third lens is negative.

In another aspect, a virtual reality device is provided. The virtual reality device includes the optical system as described in any of the above embodiments, and further includes a micro display screen. The micro display screen is perpendicular to a principal optical axis of the optical system. In an extending direction of the principal optical axis of the optical system, a distance between a surface of the first lens away from the micro display screen and the micro display screen is greater than or equal to a focal length of the optical system.

In some embodiments, relative positions of the first lens, the second lens and the third lens are fixed. In the extending direction of the principal optical axis of the optical system, a distance between a surface of the third lens proximate to the micro display screen and the micro display screen is in a range from 11.5 mm to 15.8 mm, inclusive.

In yet another aspect, a virtual reality device is provided. The virtual reality device includes the optical system as described in any of the above embodiments, and further includes a mounting part. The mounting part is configured for detachable mounting of a display terminal such that a display surface of the display terminal is perpendicular to a principal optical axis of the optical system, and a distance between a surface of the first lens away from the mounting part and a display surface of the display terminal in an extending direction of the principal optical axis of the optical system is greater than or equal to a focal length of the optical system.

In some embodiments, relative positions of the first lens, the second lens and the third lens are fixed. In the extending direction of the principal optical axis of the optical system, a distance between a surface of the third lens proximate to the display surface of the display terminal and the display surface of the display terminal is in a range from 11.5 mm to 15.8 mm, inclusive.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

FIG. 5 is a modulation transfer function graph of an optical system, in accordance with some embodiments;

FIG. 6 is a lateral chromatic aberration graph of an optical system, in accordance with some embodiments;

DETAILED DESCRIPTION

Figure 1:
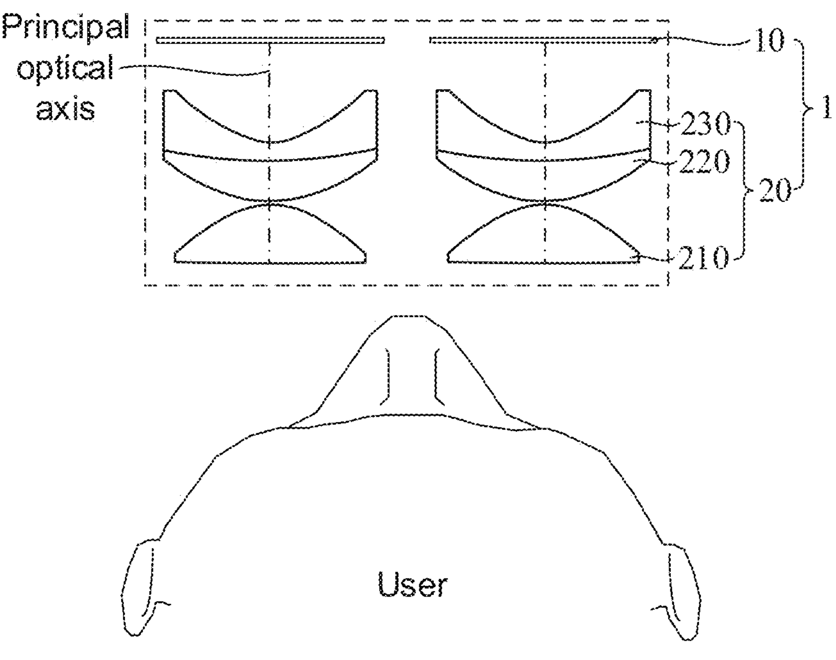
FIG. 1 is a structural diagram of a virtual reality device, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description, the term such as "one embodiment", "some embodiments", "exemplary embodiments", "example", "specific example" or "some examples" is intended to indicate that specific features, structures, materials or characteristics related to the embodiment(s) or example(s) are included in at least one embodiment or example of the present disclosure. Schematic representation of the above term does not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "multiple", "a plurality of" or "the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

As used herein, the term such as "about", "substantially" or "approximately" as used herein includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable range of deviation of a particular value. The acceptable range of deviation is determined by a person of ordinary skill in the art in view of measurement in question and the error associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

Exemplary embodiments are described herein with reference to sectional views and/or plan views as idealized exemplary drawings. In the accompanying drawings, thicknesses of layers and sizes of regions are enlarged for clarity. Variations in shapes with respect to the accompanying drawings due to, for example, manufacturing technologies and/or tolerances may be envisaged. Therefore, the exemplary embodiments should not be construed as being limited to the shapes of the regions shown herein, but as including shape deviations due to, for example, manufacturing. For example, an etched area shown in a rectangular shape generally has a feature being curved. Therefore, the regions shown in the accompanying drawings are schematic in nature, and their shapes are not intended to show actual shapes of the regions in a device, and are not intended to limit the scope of the exemplary embodiments.

In the related art, an optical system of a pancake-type virtual reality (VR) device generally includes a lens group (composed of at least two lenses) and a catadioptric assembly (including an optical component such as a polarized reflection sheet). In the pancake-type VR device, a folded light path may be formed through light reflection and changes of light polarization state, so that the thickness of the optical system in the VR device may be greatly reduced, and light weight and small thickness of the VR device may be realized. However, due to the influence of materials, manufacturing processes and other factors, there is a birefringence effect in a lens in the folded light path. Therefore, there is an undesired change in polarization state of light passing through the lens, and when the light reaches the polarized reflection sheet for the first time, a large amount rays of the light passes through the polarized reflection sheet, resulting in ghosting. When the light travels along the transmission path and reaches the polarized reflection sheet again, the light may not wholly pass through the polarized reflection sheet, which causes a loss of effective light, and a low light efficiency of the VR device. In addition, in some solutions, a Fresnel lens may be used to replace a lens of the lens group to reduce the thickness of the optical system. However, the Fresnel lens is difficult to design and process, and is costly; in addition, the Fresnel lens has a serious glare problem and may not achieve a good imaging effect.

Figure 2:
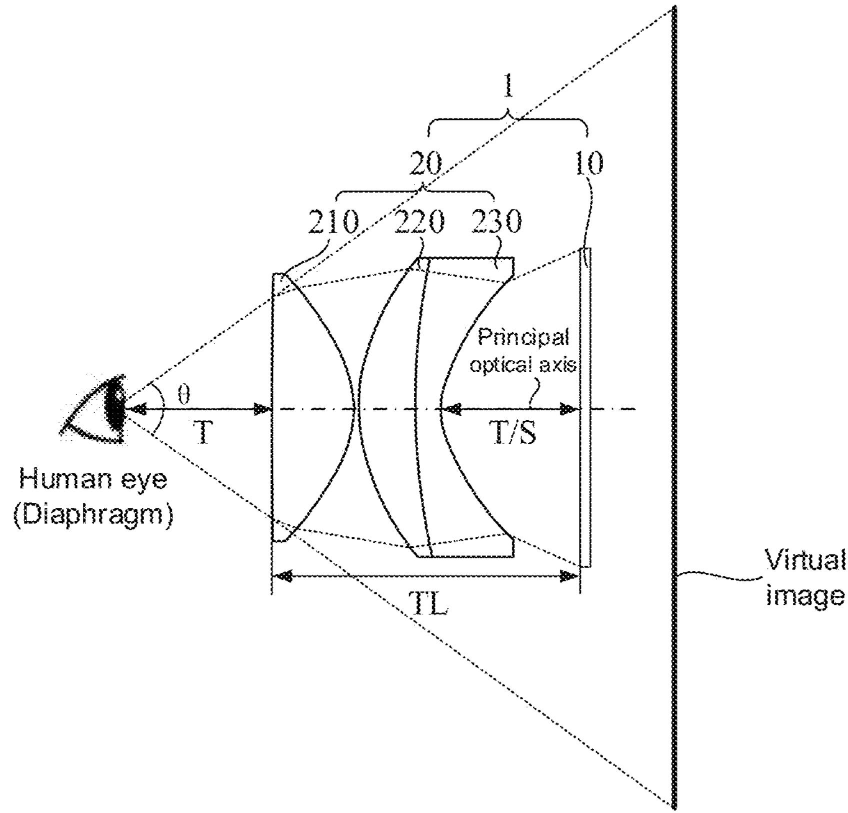
FIG. 2 is an optical path diagram of a virtual reality device, in accordance with some embodiments.

In order to solve the above problem, referring to FIGS. 1 and 2, some embodiments of the present disclosure provide a VR device 1. The VR device 1 may be an all-in-one VR device, and includes at least one micro display screen 10 (e.g., two micro display screens 10) used to display images and at least one optical system 20 (e.g., two optical systems 20). The micro display screen 10 is a display screen with a display size in a range from about 0.2 inch to about 2.5 inch, but is not limited thereto. It can be understood that, the micro display screen 10 may be a display screen with a smaller display size, for example, the display size thereof is less than or equal to 0.2 inch. The optical system 20 includes a plurality of (e.g., three) lenses. The image displayed by the micro display screen 10 is transmitted to a human eye through the optical system 20, and the human eye can trace the received light backwards and view a magnified virtual image of the displayed image, thus creating a sense of immersion. The specific arrangement of the micro display screen 10 and the optical system 20 will be described below. In addition, the specific shape of the VR device 1 is not limited too much. For example, the VR device 1 may be a helmet, a head band, glasses or a hat, which has a VR function.

For example, the micro display screen 10 may be a liquid crystal display (LCD) screen, a liquid crystal on silicon (LCOS) display screen. Alternatively, the micro display screen 10 may be a self-luminescent display screen, such as an organic light-emitting diode (OLED) display screen, a quantum dot light-emitting diode (QLED) display screen, or a small-sized light-emitting diode (LED) (such as mini-LED or micro-LED) display screen.

Figure 3:
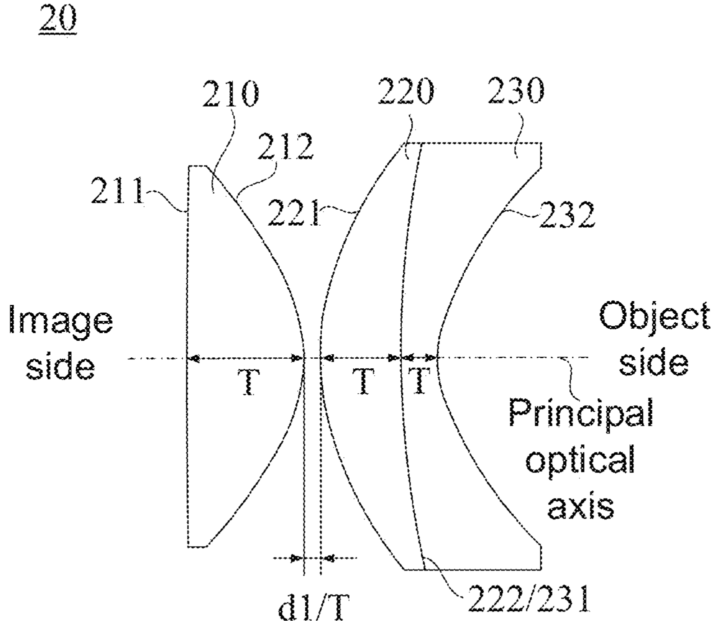
FIG. 3 is a structural diagram of an optical system, in accordance with some embodiments.

Referring to FIG. 3, some other embodiments of the present disclosure provide an optical system 20, which may be used in the VR device 1. The optical system 20 includes a first lens 210, a second lens 220 and a third lens 230 that are sequentially arranged from an image side to an object side, and principal optical axes of the first lens 210, the second lens 220 and the third lens 230 are collinear. The principal optical axes being collinear means that the principal optical axes of the first lens 210, the second lens 220 and the third lens 230 have a same extending direction and are all in a same line; and correspondingly, optical centers of the three lenses are also in a same line. Since the principal optical axes are collinear, it is conducive to reducing the design difficulty of the optical system 20 and improving the imaging quality of the optical system 20. For the optical system 20, the image side refers to a side on which the optical system 20 ultimately images, that is, a side the user views; the object side refers to a side on which an image is generated, that is, a side where the micro display screen is arranged. From the user to the micro display screen (i.e., from the image side to the object side), the first lens 210, the second lens 220 and the third lens 230 are sequentially arranged. Light emitted from the micro display screen sequentially passes through the third lens 230, the second lens 220 and the first lens 210 and is then transmitted to the user. No polarized reflection sheet or other optical structure is required in the optical system 20, and the transmission path of the light is straight through. In this way, it is possible to avoid the existence of stray light such as ghosting and glare, and the imaging quality is improved, and furthermore, it is possible to avoid the influence of optical structures such as the polarized reflection sheet on the amount of output light, and the optical system 20 may have a high light efficiency.

For example, with continued reference to FIG. 3, the first lens 210 is a convex lens. The first lens 210 may be a biconvex lens, a piano-convex lens or a meniscus lens with a positive focal power. At least one (e.g., all) of the second lens 220 and the third lens 230 is a meniscus lens. For example, the second lens 220 is a meniscus lens, and the third lens 230 is a biconcave lens; alternatively, the second lens 220 is a convex lens, and the third lens 230 is a meniscus lens; alternatively, the second lens 220 and the third lens 230 are both meniscus lenses. The second lens 220 and the third lens 230 that meet the above limitations may also be arranged in other ways, and details will not be provided here. In a case where a surface of a lens in the first lens 210, the second lens 220 and the third lens 230 is not flat, the surface may be a spherical surface, an aspherical surface, a free-form surface, or the like, which is not limited too much here. A distance between two surfaces of the lens in the extending direction of the principal optical axes is a thickness of the lens. In a case where the thickness of the lens is less than a focal length of the lens, the lens is a thin lens. According to the lens maker's formula, with regard to a thin lens, when a curvature of the thin lens is larger, the focal length of the thin lens is smaller. In the embodiments of the present disclosure, the first lens 210, the second lens 220 and the third lens 230 are all thin lenses; at least one of the second lens 220 and the third lens 230 is a meniscus lens, and the meniscus lens has a small radius of curvature, a large curvature and a small focal length; therefore, when the second lens 220 and the third lens 230 are used in combination, the equivalent focal length thereof is small. Compared to a case where the second lens and the third lens adopt other types of lenses, in the embodiments of the present disclosure, the at least one of the second lens 220 and the third lens 230 is a meniscus lens, so that it is possible to achieve a small focal length of the optical system 20 (the focal length is the equivalent focal length when the first lens 210, the second lens 220 and the third lens 230 are used in combination).

The optical system 20 of the VR device may be equivalent to a convex lens (referred to as an equivalent convex lens below). An object distance of the equivalent convex lens is a distance between the micro display screen and an optical center of the equivalent convex lens in an extending direction of a principal optical axis of the equivalent convex lens (i.e., the extending direction of the principal optical axes of the three lenses of the optical system 20). It can be known from the rule of the imaging of the convex lens, in order to achieve imaging at the human eye, the object distance is required to be limited to be greater than a focal length of the equivalent convex lens (i.e., a focal length of the optical system 20). The greater the focal length of the equivalent convex lens, the larger distance between the micro display screen and the optical center of the equivalent convex lens is required to be set, and accordingly, the greater the length of the whole of the micro display screen and the equivalent convex lens will be, and the thicker and heavier the VR device provided with the micro display screen and the optical system 20 therein will be. In the embodiments of the present disclosure, the first lens 210 is a convex lens, and the at least one of the second lens 220 and the third lens 230 is a meniscus lens, so that the focal length of the optical system 20 is small, and it is possible to achieve imaging when an object distance is small. As a result, the VR device with light weight and small thickness may be achieved.

When light rays of different colors pass through a same lens, the light rays of different colors have different refractive indexes due to their different wavelengths; therefore, the light rays of different colors are concentrated at different positions of the optical axis of the lens, resulting in chromatic aberration (which may also be referred as a dispersion phenomenon). In order to correct the chromatic aberration, for example, a refractive index of the second lens 220 may be not equal to a refractive index of the third lens 230. A ratio of the refractive index of the second lens 220 to the refractive index of the third lens 230 is in a range from 0.85 to 1.15 inclusive, and/or an absolute value of a difference between the refractive index of the second lens 220 and the refractive index of the third lens 230 is greater than or equal to 0.1. The ratio of the refractive index of the second lens 220 to the refractive index of the third lens 230 may be 0.9, 0.95, 1.05, 1.1, 1.12, or 1.14. The absolute value of the difference between the refractive index of the second lens 220 and the refractive index of the third lens 230 may be 0.15, 0.2, 0.35, 0.5, or 0.55. For example, the refractive index of the second lens 220 is smaller than the refractive index of the third lens 230; the refractive index of the second lens 220 is 1.55, and the refractive index of the third lens 230 is 1.67; the ratio of the refractive index of the second lens 220 to the refractive index of the third lens 230 is about 0.93, and the absolute value of the difference between the refractive index of the second lens 220 and the refractive index of the third lens 230 is 0.12.

The greater the refractive index of the lens, the more serious the dispersion and the smaller the Abbe number; the smaller the refractive index of the lens, the slighter the dispersion and the larger the Abbe number. Considering an example in which the refractive index of the third lens 230 is greater than the refractive index of the second lens 220, the Abbe number of the third lens 230 is smaller than the Abbe number of the second lens 220, and the second lens 220 is matched with the third lens 230, so that the chromatic aberration produced by either of the second lens 220 and the third lens 230 may be compensated by the other, which may minimize the combined chromatic aberration. The same applies in a case where the refractive index of the second lens 220 is greater than the refractive index of the third lens 230. In order to achieve that the second lens 220 and the third lens 230 have different refractive indexes, the two may be made of different materials, which is not limited too much here.

For example, a ratio of the Abbe number of the second lens 220 to the Abbe number of the third lens 230 is in a range from 0.3 to 3 inclusive, and is not equal to 1; and/or an absolute value of a difference between the Abbe number of the second lens 220 and the Abbe number of the third lens 230 is in a range from 30 to 40, inclusive. The ratio of the Abbe number of the second lens 220 to the Abbe number of the third lens 230 may be 0.5, 0.65, 0.8, 1.2, 1.5, 1.8, 2.2, 2.5, or 2.7; the absolute value of the difference between the Abbe number of the second lens 220 and the Abbe number of the third lens 230 may be 32, 34, 35, or 38. The larger difference between Abbe numbers of lenses, the smaller the focal power and the greater the equivalent focal length of a combination of the lenses; the smaller difference between the Abbe numbers of the lenses, the greater the focal power and the smaller the equivalent focal length of the combination of lenses. In a case where the difference between the Abbe number of the second lens 220 and the Abbe number of the third lens 230 is too large (the difference is larger than 40, e.g., is 60), the focal power of the combination of the second lens 220 and the third lens 230 is small, the equivalent focal length of the combination of the second lens 220 and the third lens 230 is large, and the focal length of the optical system 20 is large; therefore, it is not conducive to the thinness and lightness of the VR device. In a case where the difference between the Abbe number of the second lens 220 and the Abbe number of the third lens 230 is too small (the difference is less than 30, e.g., is 10), the focal power of the combination of the second lens 220 and the third lens 230 is large, which may cause a serious aberration, affecting the imaging quality. Therefore, in the embodiments of the present disclosure, by providing the ratio of the Abbe number of the second lens 220 to the Abbe number of the third lens 230 in a range from 0.3 to 3 inclusive and not equal to 1, and/or providing the absolute value of the difference between the two in a range from 30 to 40 inclusive, the combined chromatic aberration may further be reduced, and it is possible to avoid the adverse effect caused by too large or too small difference between the Abbe numbers.

For example, similar to the above description, a ratio of a refractive index of the first lens 210 to the refractive index of the second lens 220 may be in a range from 0.85 to 1.15 inclusive, and/or a ratio of the Abbe number of the first lens 210 to the Abbe number of the second lens 220 may be in a range from 0.3 to 3 inclusive. The ratio of the refractive index of the first lens 210 to the refractive index of the second lens 220 may be 0.9, 0.95, 1.05, 1, 1.1, 1.12, 1.14, etc.; the ratio of the Abbe number of the first lens 210 to the Abbe number of the third lens 230 may be 0.5, 0.65, 0.8, 1, 1.1, 1.2, 1.5, 1.8, 2.2, 2.5, 2.7, etc. The beneficial effects achieved by the setting are same as the beneficial effects of the setting of the second lens 220 and the third lens 230 mentioned above, and will not be repeated here.

Figure 4:
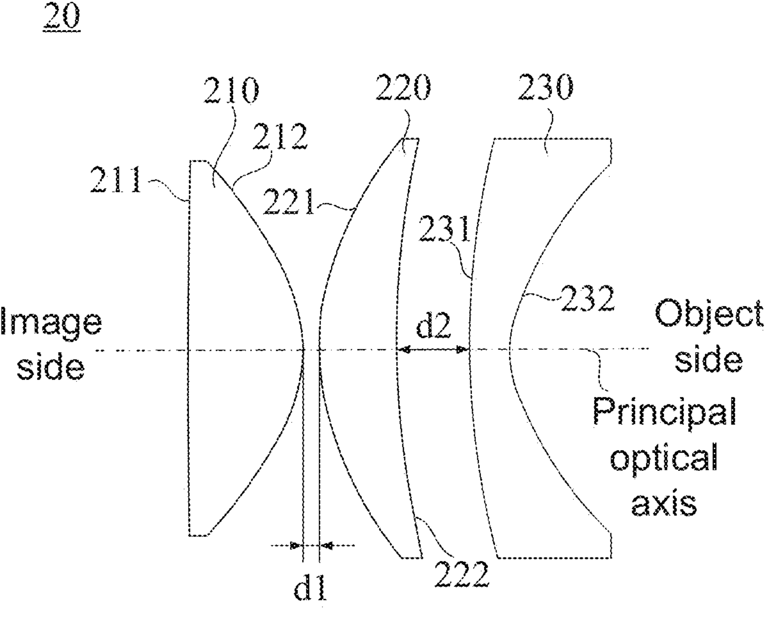
FIG. 4 is a structural diagram of an optical system, in accordance with some other embodiments.

For example, referring to FIG. 4, two lenses that are arranged adjacently are not in contact with each other. That is, the first lens 210 and the second lens 220 are not in contact with each other, and the second lens 220 and the third lens 230 are also not in contact with each other. An intersection point of a principal optical axis of a lens and a surface of the lens is a vertex of the surface of the lens. A distance between two surfaces, close to each other, of two lenses arranged adjacently is a distance between two vertexes of the two surfaces, close to each other, of the two lenses. In a case where the distance between the two surfaces, close to each other, of the two lenses arranged adjacently is too large, the length of the whole optical system 20 is large, which is not conducive to the thinness and lightness of the VR device. In a case where the distance between the two surfaces, close to each other, of the two lenses arranged adjacently is too small, the assembly process of the optical system 20 is difficult, which is not conducive to the control and optimization of the manufacturing costs. In light of this, in the embodiments of the present disclosure, as shown in FIG. 4, a distance d1 of two surfaces, close to each other, of the first lens 210 and the second lens 220 in the extending direction of the principal optical axes is in a range from 0.5 mm to 3 mm, inclusive, and may be, for example, 0.5 mm; a distance d2 of two surfaces, close to each other, of the second lens 220 and the third lens 230 in the extending direction of the principal optical axes is in a range from 0.5 mm to 3 mm inclusive, and may be, for example, 3 mm. In this way, it is possible to avoid the above-mentioned problems.

Based on the above, for example, at least one (e.g., each) surface of all surfaces of the first lens 210, the second lens 220 and the third lens 230 is an aspherical surface. By using the aspherical lens, aberrations such as coma and image dispersion that affect the imaging quality may be corrected without affecting the luminous flux, which is conducive to improving the imaging quality. In addition, the using of the aspherical lens has a positive impact on the improvement of the optical performance of the optical system 20, the expansion of the field angle, and the thinness and lightness of the optical system 20.

Furthermore, the aspherical surface may be an even-order aspheric surface. The even-order aspheric surface is easy to design and manufacture, which is conducive to the reduction of the manufacturing costs. In a case where a surface of a lens is an even-order aspheric surface, its shape satisfies the following surface formula:

$$Z = \frac{cr^2}{1 + \sqrt{1 - (k+1)c^2r^2}} + \sum_{i=1} A_{2i} r^{2i}$$

Here, Z is a sag of the lens, c is a curvature at vertex of the aspherical surface, r is a distance between a vertex of the aspherical surface and any other point on the aspherical surface, $A_{2i}$ is a coefficient of a multiple-order term, and k is a conic quadric coefficient. When k is smaller than −1 (k<−1), a surface shape of the surface of the lens is hyperbola; when k is equal to −1 (k=−1), the surface shape of the surface of the lens is parabola; when k is greater than −1 and smaller than 0 (−1<k<0), the surface shape of the surface of the lens is ellipse; when k is equal to 0 (k=0), the surface shape of the surface of the lens is circle; when k is greater than 0 (k>0), the surface shape of the surface of the lens is oblate ellipse.

For another example, referring to FIG. 3, the first lens 210 and the second lens 220 are not in contact with each other, and surfaces, of the second lens 220 and the third lens 230 that are close to each other are bonded to each other. The shapes of the surfaces of the second lens 220 and the third lens 230 that are bonded to each other are preset, and the shapes of the two surfaces that are bonded to each other substantially match. Under the existing technological level, a spacing between the two surfaces that are bonded to each other should be as small as possible. The specific method for achieving that the surfaces, close to each other, of the second lens 220 and the third lens 230 are bonded to each other is not limited too much. For example, a mechanical method may be used to combine the two lenses into one optical component by a mechanical part such as a spacer ring or a pressing ring. For another example, an optical contacting method may be used, and the two lenses are combined into one optical component by the intermolecular attraction between the two surfaces to be bonded. For yet another example, a cement method may be used to cement the two lenses into a cemented doublet, and the optical cement used may be at least one of organic silicone cement, acrylic resin and unsaturated polyester, polyurethane, epoxy resin, etc. Since the surfaces of the second lens 220 and the third lens 230 that are close to each other are bonded to each other, the optical system 20 has a compact overall structure, which is conducive to achieving the thinness and lightness of the VR device. In addition, when light exiting from the third lens 230 directly goes into the second lens 220, the air spacing is eliminated, so that the stability of light transmission is improved, and the imaging quality of the optical system 20 is improved. Under this premise, the distance d1 between the surfaces of the first lens 210 and the second lens 220 that are close to each other in the extending direction of the principal optical axes may be in a range from 0.5 mm to 3 mm inclusive, such as 0.5 mm. In this way, the distance between the surfaces of the two lenses that are close to each other is within a reasonable range, it may be possible to achieve the aforementioned beneficial effects, and details will not be repeated here.

For example, the surfaces of the second lens 220 and the third lens 230 that are close to each other are bonded to each other, and the surfaces that are bonded to each other are both spherical surfaces. The design and preparation of the spherical surface is less difficult, and it is easier to achieve conforming, which is beneficial to reduce the difficulty of preparation and control the manufacturing costs. In addition to the surfaces of the second lens 220 and the third lens 230 that are bonded to each other, at least one (e.g., each) surface of remaining surfaces of the optical system 20 is an aspherical surface. For example, the remaining surfaces may all be even-order aspheric surfaces. The surface formula of the even-order aspheric surface is the same as the preceding, and the beneficial effects that may be achieved by this setting are similar to the preceding, and details will not be repeated here.

Referring to FIGS. 3 and 4, in a case where all surfaces of the first lens 210, the second lens 220 and the third lens 230 are each a spherical surface or an aspherical surface, from the image side to the object side, two surfaces of the first lens 210 are a first surface 211 and a second surface 212 respectively, two surfaces of the second lens 220 are a third surface 221 and a fourth surface 222 respectively, and two surfaces of the third lens 230 are a fifth surface 231 and a sixth surface 232 respectively. A radius of curvature of the first surface 221 is in a range from −500 mm to −100 mm inclusive; the second surface 212 is convex towards the side where the micro display screen is located, and a radius of curvature thereof is in a range from −50 mm to −10 mm inclusive; the third surface 221 and the fourth surface 222 are both convex towards the side where the user is located, a radius of curvature of the third surface 221 is in a range from 20 mm to 100 mm inclusive, and a radius of curvature of the fourth surface 222 is in a range from 50 mm to 200 mm inclusive; the fifth surface 231 and the sixth surface 232 are both convex towards the side where the user is located, a radius of curvature of the fifth surface 231 is in a range from 50 mm to 200 mm inclusive, and a radius of curvature of the sixth surface 232 is in a range from 0 mm to 20 mm inclusive.

For example, the focal lengths of the first lens 210, the second lens 220 and the third lens 230 are all less than or equal to 50 mm. Each lens in the optical system 20 has a small focal length, which may ensure that the optical system 20 has a small focal length, thus facilitating the thinning of the VR device.

Limited by the above-mentioned settings, the focal length of the optical system 20 in the embodiments of the present disclosure is a small, which is in a range from 25 mm to 32 mm inclusive. The optical system 20 is a short focal length optical system 20, and a width of the eye box (the viewing area) is not less than 8 mm, which may ensure the imaging effect and achieve the thinness and lightness of the VR device.

For example, referring to FIG. 2, the field of view (FOV) θ of the optical system 20 is in a range from 60° to 70° inclusive. Among the light rays passing through the first lens 210 from the object side to the image side, an included angle between the light ray at the outermost edge and the principal optical axis of the optical system 20 is half of the field of view. For the optical system 20, the smaller focal length of the optical system 20, the larger the field of view θ, and conversely, the smaller the field of view θ. In a case where the field of view of the optical system 20 is too small (the field of view is less than 60°, e.g., is 30°), the focal length of the optical system 20 is too large, and a large distance between the optical system 20 and the micro display screen 10 is thus required, which is not conducive to achieving the thinness and lightness of the VR device. In addition, a small field of view θ may cause that the user has a reduced sense of immersion when using the VR device, which affects the user experience. In a case where the field of view θ of the optical system 20 is too large (the field angle is greater than 70°, e.g., is 90°), when the displayed image is observed through the optical system 20, the observed displayed image is likely to have perspective distortion, which will have an adverse effect on the imaging effect. Therefore, in the embodiments of the present disclosure, the field of view θ of the optical system 20 is set to be in a range from 60° to 70° inclusive, and the angle value is within a reasonable range, which may balance the imaging effect and device volume.

For example, referring to FIGS. 2, 3 and 4, the first lens 210 may be a biconvex lens, or a meniscus lens with a positive focal power. For example, the focal power of the first lens 210 may be in a range from 0.02 to 0.1, inclusive. The two surfaces of the first lens 210 are each a curved surface with a certain curvature. During the light transmission process, the two curved surfaces may deflect the light to compensate for the generated aberration, so that the aberration may be eliminated and a good imaging effect may be achieved.

For example, for the second lens 220 and the third lens 230, the focal power of the second lens 220 is positive, the focal power of the third lens 230 is negative, and a sum of the focal power of the second lens 220 and the focal power of the third lens 230 is negative. The focal power of the second lens 220 may be in a range from 0.02 to 0.1, inclusive. The focal power of the third lens 230 may be in a range from −0.2 to −0.02, inclusive. The second lens 220 and the third lens 230 may be equivalent to a lens with a negative focal power. The first lens 210 is a convex lens, and the focal power thereof is positive. The entire optical system 20 may be equivalently a combination of a lens with a positive focal power and a lens with a negative focal power. The combination of the positive lens and the negative lens may achieve a large field of view, and may also correct aberrations such as spherical aberration, field curvature, and distortion, so that the resolution of the VR device may be improved, and a high-definition display in full field of view is ensured.

For example, the material of each lens of the optical system 20 may be glass or plastic, or may be other optional materials. Materials of the three lenses may be the same, or may be different, which is not limited too much. Various settings may all achieve the above-mentioned beneficial effects. For example, at least one (e.g., all) of the first lens 210, the second lens 220 and the third lens 230 is made of plastic. The material may be acrylic resin, polycarbonate resin, polystyrene resin, vinyl chloride resin, diethylene glycol diallyl carbonate and the like. Since each lens of the optical system 20 is made of plastic, the light weight of the device may be achieved, and the user experience may be improved.

In order to verify the improvement of the imaging effect of the optical system 20 in the embodiments of the present disclosure, referring to FIGS. 2 and 3, the optical system 20 is designed according to the above-mentioned limitations, and a micro display screen 10 corresponding to the optical system 20 is set accordingly, and by simulation, relevant parameters are obtained for evaluation. A diaphragm (simulating a pupil size of a human eye), the optical system 20 and the micro display screen 10 are arranged as shown in the figures. The design parameters of the diaphragm and the optical system 20 are shown in Table 1 below. A surface of a lens of the optical system 20 may be a spherical surface or an aspherical surface, and the aspherical surface is an even-order aspheric surface and satisfies the above-mentioned surface formula. The selected micro display screen 10 may be a liquid crystal display screen. The diagonal length of the micro display screen 10 is 2.1 inch, the resolution thereof is 2160 by 2160, and by calculation, the length of each pixel point is about 17.5 μm.

TABLE 1

F = 30 mm, TL = 35 mm, FOV = 70°

| Serial number | Surface | R/mm | T/mm | k | Coefficient of a multiple-order term $A_4$ | Coefficient of a multiple-order term $A_6$ | Material: Refractive index | Material: Abbe number |
|---|---|---|---|---|---|---|---|---|
| 1 | / | Infinity | 15 | 0 | / | / | / | / |
| 21 | Aspherical surface | −209.27 | 9.3 | 77.62 | $1.74 \times 10^{-5}$ | $-8.46 \times 10^{-9}$ | 1.54 | 56.2 |
| 22 | Aspherical surface | −10.22 | 0.5 | −3.71 | $-4.69 \times 10^{-5}$ | $7.51 \times 10^{-8}$ | | |
| 31 | Aspherical surface | 22.68 | 6.4 | −1.73 | $2.66 \times 10^{-5}$ | $-5.06 \times 10^{-8}$ | 1.54 | 56.2 |
| 32 | Spherical surface | 75.23 | 3 | 0 | / | / | | |
| 41 | Spherical surface | 75.23 | 3 | 0 | / | / | 1.64 | 22.4 |
| 42 | Aspherical surface | 8.08 | 15.8 | −4.79 | $6.72 \times 10^{-5}$ | $-9.94 \times 10^{-8}$ | | |

In the above Table, F is the focal length of the optical system 20, TL is a distance between the vertex of the first surface 211 and the micro display screen 10 in the extending direction of the principal optical axes of the three lenses of the optical system 20, and R is the radius of curvature at the vertex of the surface of the lens. For a surface (including a surface of the diaphragm), T is a distance between the surface and another surface that is adjacent to the surface in the extending direction of the principal optical axes of the three lenses of the optical system 20 from the diaphragm to the micro display screen 10. For example, a T corresponding to the diaphragm is a distance between the diaphragm and the vertex of the first surface 211, a T corresponding to the first surface 211 is a distance between the vertex of the first surface 211 and the vertex of the second surface 212, and so forth. For each aspherical surface, the coefficients of multiple-order terms are all 0, except for $A_4$ and $A_6$ that take values as shown in Table 1.

Since the principal optical axes of all lenses of the optical system 20 are collinear, and the surfaces of the lenses are each a spherical surface or an aspherical surface, only the angle range of 0° to ½ field of view is to be tested when detecting parameters. FIG. 5 shows a graph of the modulation transfer function (MTF) of the optical system 20 in the embodiments of the present disclosure (which may also be referred as a MTF graph). The graph shows the percentage of the imaging contrast of the optical system 20 in the image contrast of the displayed image of the micro display screen 10 (the modulus of optical transfer function (OTF)) when the spatial frequency measured in cycles is in a range from 0 lp/mm to 30 lp/mm. The curves of different line shapes (curve A to curve N) in the figure correspond to MTF curves at different field of views. The MTF curve corresponding to each field of view is smooth and compact. When the spatial frequency is 30 lp/mm, the modulus of OTF corresponding to each curve is not less than 0.2. It can be seen that the optical system 20 has a good imaging quality.

Referring to the lateral chromatic aberration graph shown in FIG. 6, the horizontal coordinate is the lateral chromatic aberration, and the vertical coordinate is the field of view. It can be seen that the lateral chromatic aberration of the optical system does not exceed 17 μm when the field of view is in a range from 0° to 35° inclusive. For the micro display screen 10 with a diagonal length of 2.1 inch and a resolution of 2160 by 2160, the lateral chromatic aberration is smaller than the size of the pixel point of the micro display screen 10, and thus is not perceived by the user. Therefore, a significant effect of chromatic aberration improvement is obtained.

Figure 7:
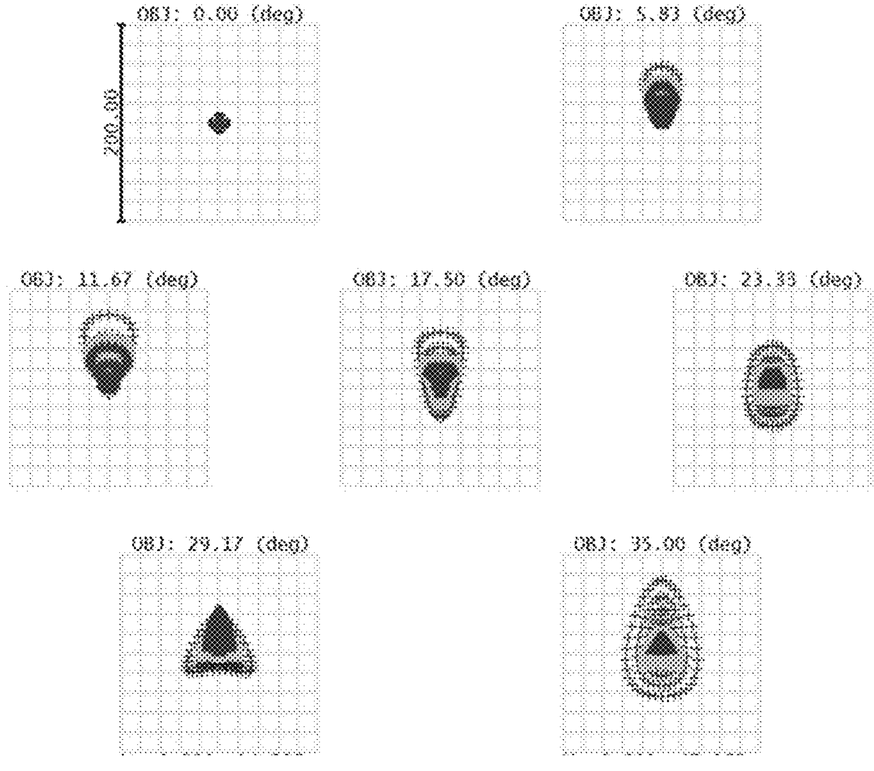
FIG. 7 is a spot diagram of an optical system, in accordance with some embodiments.

FIG. 7 is a spot diagram at seven field of views (or object heights) of 0°, 5.83°, 11.67°, 17.5°, 23.33°, 29.17° and 35.0°. The maximum root mean squared radius at the plurality of field of views is only 22 μm, which indicates that clear images may be viewed at all field of views and the imaging quality is good.

As seen above, the optical system provided in the embodiments of the present disclosure not only facilitates the thinness and lightness of the VR device, but also enables a high-definition display in full field of view and has a good imaging quality.

In some embodiments of the present disclosure, referring to FIGS. 1 and 2, the VR device 1 may include two micro display screens 10 and two optical systems 20. Each optical system 20 corresponds to one micro display screen 10. The micro display screen 10 is perpendicular to the principal optical axis of the optical system 20 corresponding to the micro display screen 10. The image formed by each optical system 20 is transmitted to one eye of the user.

For example, the distance TL between the surface of the first lens 210 away from the micro display screen 10 and the micro display screen 10 in the extending direction of the principal optical axis of the optical system 20 (i.e., the extending direction of the principal optical axes of the three lenses of the optical system 20) is greater than or equal to the focal length of the optical system 20. The distance TL between the vertex of the first surface of the first lens 210 and the center of the micro display screen 10 may be greater than or equal to the focal length of the optical system 20. In conjunction with the foregoing, the optical system 20 may be regarded as an equivalent convex lens. In this way, it may ensure that a distance between the micro display screen 10 and the optical center of the equivalent convex lens is greater than the focal length of the equivalent convex lens (i.e., the focal length of the optical system 20), so that the imaging effect may be ensured.

For example, the distance TL between the surface of the first lens 210 away from the micro display screen 10 and the micro display screen 10 in the extending direction of the principal optical axis of the optical system 20 is equal to the focal length of the optical system 20. In this way, it is possible to minimize the length of the whole formed by the optical system 20 and the micro display screen 10 on the premise of ensuring imaging, so that the thinness and lightness of the VR device 1 may be achieved to the greatest extent. On that premise, the focal length of the optical system 20 is in a range from 25 mm to 32 mm inclusive, the field of view of the optical system 20 is in a range from 60° to 70° inclusive, and the diagonal length of the selected micro display screen 10 is in a range from 1.5 inch to 2.5 inch inclusive. Furthermore, the pixel density of the micro display screen 10 may be not less than 1500 PPI, so that the size of the pixel point of the micro display screen 10 is not less than the lateral chromatic aberration of the optical system 20, which ensures the correction effect of chromatic aberration.

For example, referring to FIGS. 2 and 3, the relative positions of the first lens 210, the second lens 220 and the third lens 230 are fixed. The third lens 230 is proximate to a surface of the micro display screen 10, and in the of the principal optical axis of the optical system 20, a distance S between the third lens 230 and the micro display screen 10 is in a range from 11.5 mm to 15.8 mm inclusive. In the extending direction of the principal optical axis of the optical system 20, the optical system 20 may be moved back and forth relative to the micro display screen 10. When users with different vision conditions use the VR device, the displayed image may be clearly seen by adjusting a distance between the optical system 20 and the human eyes to a suitable value. Therefore, it is possible to improve the practicability of the VR device, and the VR device is available to a wider group of users. For the above-mentioned optical system 20, when the distance between the sixth surface 231 of the third lens 230 and the surface of the micro display screen 10 is adjusted within a range from 15.8 mm to 11.5 mm inclusive, the VR device provided with the optical system 20 therein is suitable for the group of users with myopia of a power of 0 degrees to 600 degrees (corresponding to a diopter of 0 D to −6 D).

Figure 8:
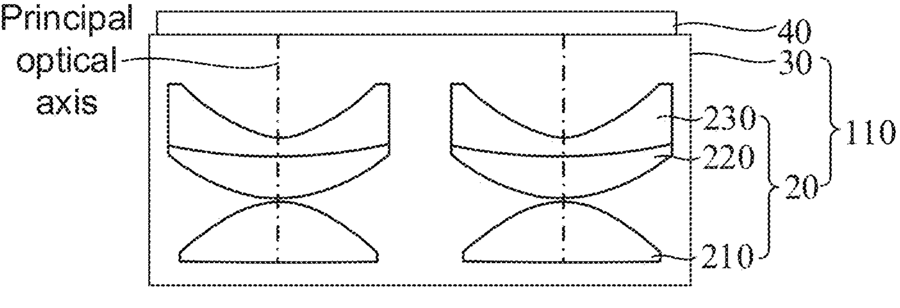
FIG. 8 is a structural diagram of another virtual reality device, in accordance with some embodiments.

Some other embodiments of the present disclosure provide a mobile phone box-type VR device. As shown in FIG. 8, the mobile phone box-type VR device 110 includes the above-mentioned optical system 20, and further includes a mounting part 30. The mounting part 30 is configured for detachable mounting of a display terminal 40 such that the display surface of the display terminal 40 is perpendicular to the principal optical axis of the optical system 20. A distance between the surface of the first lens away from the mounting part and the display surface of the display terminal in the extending direction of the principal optical axis of the optical system (i.e., the extending direction of the principal optical axes of the three lenses of the optical system) is greater than or equal to the focal length of the optical system. The display surface of the display terminal is a surface of the display terminal proximate to the optical system. The display terminal may be an electronic device such as a mobile phone that may display images independently. The VR device including the optical system may also have good imaging effect and may achieve the thinness and lightness.

For example, in the mobile phone box-type VR device, the relative positions of the first lens, the second lens and the third lens are fixed, and the distance between the surface of the third lens proximate to the display surface of the display terminal and the display surface of the display terminal in the extending direction of the principal optical axis of the optical system is in a range from 11.5 mm to 15.8 mm inclusive, so that the VR device is also suitable for the group of users with different vision conditions.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical system, comprising:

a first lens, a second lens and a third lens that are sequentially arranged from an image side to an object side, and principal optical axes of the first lens, the second lens and the third lens being collinear, wherein the first lens is a convex lens; and at least one of the second lens and the third lens is a meniscus lens; wherein a focal power of the second lens is positive, a focal power of the third lens is negative, and a sum of the focal power of the second lens and the focal power of the third lens is negative.

2. The optical system according to claim 1, wherein a refractive index of the second lens is not equal to a refractive index of the third lens.

3. The optical system according to claim 2, wherein a ratio of the refractive index of the second lens to the refractive index of the third lens is in a range from 0.85 to 1.15, inclusive; and/or an absolute value of a difference between the refractive index of the second lens and the refractive index of the third lens is greater than or equal to 0.1.

4. The optical system according to claim 1, wherein a ratio of a refractive index of the first lens to a refractive index of the second lens is in a range from 0.85 to 1.15, inclusive.

5. The optical system according to claim 1, wherein a ratio of an Abbe number of the first lens to an Abbe number of the second lens is in a range from 0.3 to 3, inclusive.

6. The optical system according to claim 1, wherein at least one surface of all surfaces of the first lens, the second lens and the third lens is an aspherical surface.

7. The optical system according to claim 6, wherein the aspherical surface is an even-order aspheric surface.

8. The optical system according to claim 1, wherein the first lens and the second lens are not in contact with each other;

in an extending direction of the principal optical axes, a distance between surfaces of the first lens and the second lens that are close to each other is in a range from 0.5 mm to 3 mm, inclusive.

9. The optical system according to claim 1, wherein the second lens and the third lens are not in contact with each other; and in an extending direction of the principal optical axes, a distance between surfaces of the second lens and the third lens that are close to each other is in a range from 0.5 mm to 3 mm, inclusive; or the surfaces of the second lens and the third lens that are close to each other are bonded to each other.

10. The optical system according to claim 9, wherein the surfaces of the second lens and the third lens that are close to each other are bonded to each other, and the surfaces that are bonded to each other are each a spherical surface.

11. The optical system according to claim 1, wherein focal lengths of the first lens, the second lens and the third lens are all less than or equal to 50 mm.

12. The optical system according to claim 11, wherein a focal length of the optical system is in a range from 25 mm to 32 mm, inclusive.

13. The optical system according to claim 1, wherein a field of view of the optical system is in a range from 60° to 70°, inclusive.

14. The optical system according to claim 1, wherein the first lens is a biconvex lens, or a meniscus lens with a positive focal power.

15. A virtual reality device, comprising:

the optical system according to claim 1;

a micro display screen, the micro display screen being perpendicular to a principal optical axis of the optical system; wherein in an extending direction of the principal optical axis of the optical system, a distance between a surface of the first lens away from the micro display screen and the micro display screen is greater than or equal to a focal length of the optical system.

16. The virtual reality device according to claim 15, wherein relative positions of the first lens, the second lens and the third lens are fixed;

in the extending direction of the principal optical axis of the optical system, a distance between a surface of the third lens proximate to the micro display screen and the micro display screen is in a range from 11.5 mm to 15.8 mm, inclusive.

17. A virtual reality device, comprising:

the optical system according to claim 1;

a mounting part, the mounting part being configured for detachable mounting of a display terminal such that a display surface of the display terminal is perpendicular to a principal optical axis of the optical system, and a distance between a surface of the first lens away from the mounting part and a display surface of the display terminal in an extending direction of the principal optical axis of the optical system is greater than or equal to a focal length of the optical system.

18. The virtual reality device according to claim 17, wherein relative positions of the first lens, the second lens and the third lens are fixed;

in the extending direction of the principal optical axis of the optical system, a distance between a surface of the third lens proximate to the display surface of the display terminal and the display surface of the display terminal is in a range from 11.5 mm to 15.8 mm, inclusive.

19. The optical system according to claim 1, wherein a ratio of an Abbe number of the second lens to an Abbe number of the third lens is in a range from 0.3 to 3 inclusive, and is not equal to 1; and/or an absolute value of a difference between the Abbe number of the second lens and the Abbe number of the third lens is in a range from 30 to 40, inclusive.

20. An optical system, comprising:

a first lens, a second lens and a third lens that are sequentially arranged from an image side to an object side, and principal optical axes of the first lens, the second lens and the third lens being collinear, wherein the first lens is a convex lens; and at least one of the second lens and the third lens is a meniscus lens; wherein the first lens and the second lens are not in contact with each other;

in an extending direction of the principal optical axes, a distance between surfaces of the first lens and the second lens that are close to each other is in a range from 0.5 mm to 3 mm, inclusive.

* * * * *